Figure 4:
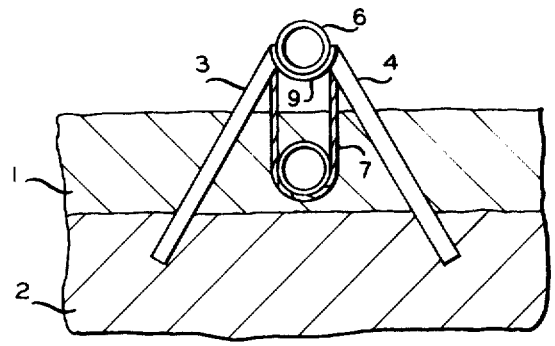

United States Patent

Bowers

[15] 3,648,468
[45] Mar. 14, 1972

[54] LAMBDA SUPPORTED PIPELINE FOR ARCTIC USE

[72] Inventor: John R. Bowers, Bartlesville, Okla.
[73] Assignee: Phillips Petroleum Company
[22] Filed: Feb. 11, 1970
[21] Appl. No.: 10,455

[52] U.S. Cl.................................................61/72.1, 248/49
[51] Int. Cl........................B63b 35/02, F16l 1/00, F16l 3/00
[58] Field of Search.....................248/49, 60, 85, 83, 84, 87; 138/106, 107; 61/72.1

[56] References Cited

UNITED STATES PATENTS

| | | | |
|---|---|---|---|
| 1,601,571 | 9/1926 | Knapp | 248/49 |
| 2,106,956 | 2/1938 | Nakamura | 248/49 |
| 2,251,739 | 8/1941 | Huntsinger | 248/60 X |
| 2,579,447 | 12/1951 | Boucher | 248/49 |
| 2,736,525 | 2/1956 | Jones | 248/83 |
| 2,780,429 | 2/1957 | Vanier | 248/60 X |
| 2,881,804 | 4/1959 | Bub | 248/49 X |

FOREIGN PATENTS OR APPLICATIONS

| | | | |
|---|---|---|---|
| 1,227,145 | 6/1958 | France | 138/106 |

*Primary Examiner*—Chancellor E. Harris
*Attorney*—Young and Quigg

[57] ABSTRACT

A stable pipeline in permafrost areas is achieved by supporting pipe on or from supports of lambda construction. The members of the lambda supports extend declivously into solidly frozen permafrost and so maintain a stable line of pipe that will not sink into ground thawed by summer warmth or by heat leakage from the pipeline.

14 Claims, 4 Drawing Figures

PATENTED MAR 14 1972 3,648,468

INVENTOR.
J. R. BOWERS
BY Young & Quigg
ATTORNEYS

LAMBDA SUPPORTED PIPELINE FOR ARCTIC USE

My invention relates to a method of laying a line of pipe within a permafrost area. In another aspect it relates to specially formed supports to hold a pipeline in a stable position. In a related aspect, the invention involves the movement or transportation of fluids within arctic regions.

Installing pipelines, particularly large pipelines, within the arctic snow and permafrost regions presents many problems. The fluids to be moved in the pipeline are generally warmer, sometimes much warmer, than the immediate surroundings. Crude oil, for example, is produced in the arctic at about 160° F., and must be maintained above about 30° F. in order to remain flowable.

There are counterbalancing social and economic forces at work as to whether to bury or not to bury a pipeline within the tundra and permafrost. The conservationists will desire a line of pipe to be laid on the tundra, utilizing supports such as the unique lambda supports I have devised in my invention, so as to avoid damage or disturbance to the tundra and hence to the sensitive ecology of the region. The pipeliners, on the other hand, may want to bury the pipeline in order to take advantage to some extent of the insulating effect of the tundra and permafrost so as to minimize loss of heat from the pipeline.

The top or surface of the ground in the permafrost country is called the tundra, and is fairly thin, being only about 36 to 40 inches in thickness. It represents the depth of the ground that melts or thaws in the summer. The depth is somewhat variable, depending on the warmth of the summer.

The next layer is the permafrost, and as the term implies it is permanently frozen, with a temperature reportedly of +17° to +19° F. The thickness of the permafrost varies from several feet to half a mole or more. In some places, this permafrost or frozen earth contains huge ice wedges or frozen buried ice mountains, as well as bodies of dry gravel of varying extent in depth. For the most part, however, the permafrost is a frozen earthlike material. While frozen, the permafrost is exceedingly hard, much harder than ordinary ice of our usual conception, so hard even that it crumples hardened steel when efforts are made to force steel pilings into the permafrost. Perhaps the untold silent frozen centuries have slowly changed the ice structure to this exceedingly hard and resistant material.

The tundra is not something that is lightly disturbed. The tundra acts as an insulator for the permafrost. If the tundra is removed, and warm weather comes, some of the permafrost melts. Of course, the permafrost melts if exposed to any source of heat. Once melted, the permafrost loses its amazing strength, and any warm heavy object on or within the permafrost simply tends to gradually melt its way downward into unknown depths.

Even well-insulated lines containing warm fluids dissipate some heat to their surroundings. The pipelines with which we are concerned range from small local fluid transporting or collection lines to 4-foot or greater diameter lines capable of moving huge quantities of produced crude across the breadth of Alaska, and ultimately across the tremendous breadth of Canada from northern oil-producing areas down to the warmer oil-consuming regions. These lines must be laid on or in this frozen ground. Furthermore, a slight movement of a pipeline can be tolerated, but largely it must be stable. The pipeline must not sink within the permafrost, nor can heaving upward be permitted in the freeze-thaw cycles of the tundra.

My invention uses unique supports of a lambda design. These lambda-form supports are placed in the permafrost in holes extending declivously into the permanently frozen permafrost beyond the tundra. Thus, my unique lambda supports for my pipeline are permanently held by the permafrost itself. The pipeline is supported by or slung from the lambda supports, and so does not depend upon finding any load bearing surface in or on the ground itself to directly support the pipe. Therefore, any minor leakage of heat from the line of pipe becomes of little consequence. Furthermore, my line of pipe is inherently free of the heaving effects of the tundra.

It is an object of my invention to provide a stable pipeline within permafrost areas. An additional object of my invention is to provide a unique method of support of a pipeline so as to minimize one or more of the hazards of heaving, sinking, thawing, and/or melting of the permafrost, insofar as feasible in permafrost country. A further object is to provide unique supports especially useful in arctic areas as pipeline supports.

The supports of my invention are essentially in the form of the Greek letter Lambda, and so I call them lambda supports. The members of the lambda support assembly extend outwardly declivously, i.e., diagonally downwardly, into permanently frozen permafrost. The upper portions of the lambda supports can be in or above the tundra, the lower portions of the extending members should be well into the permafrost itself.

The line of pipe itself can be hung from or slung from the lambda supports by various methods. Tie hangers can be used to connect with a girdle encircling the pipe so as to place the pipe essentially between the lambda support members. Looking endwise onto the line of pipe and a lambda support, the effect has the appearance of a pendulum. Or, the hanging device can be a loop-type with the tie ends toward the apex of my lambda support, and the line of pipe nesting in the lower portion of the loop.

The position of the line of pipe itself can be between the members of the lambda support and sustained above the ground by means of the lambda supports. Or, the line of pipe can be more or less laid upon the tundra, or within the tundra, or down toward or on or even within the permafrost layer. The particular placement will depend on relative convenience, the topography, and the desired degree of elevation or sunken protective depth for the line of pipe. The line of pipe also can be on or at the apex of the lambda support. In fact, my lambda supports can be used to sustain, by which I mean carry or suspend, two or more lines of pipe, of the same or different size.

It is expected that some heat will leak from the line. The pipeline contents, when liquid, will be relatively warm, compared to the surroundings. While the tundra and the permafrost act as heat insulators, so that minor heat leakage is not expected to extend far from the line of pipe itself, it is expected that there will be a zone of thaw surrounding the line of pipe, at least to the extent the line of pipe is buried below the surface. My pipeline, of course, can also be used for the transportation of other fluids, such as gases. In one mode of use of my lambda supports, diagonally laterally extending holes are cut or drilled through the tundra or other overburden down into the permafrost in an outwardly extending fashion. The vertical diagonals comprising my lambda supports are placed in these diagonal holes. In one embodiment the pipeline is run between the diagonals, and hung or suspended from the apex thereof, by a tie member or sling member, such as a loop or ring or tie rod or the hanging device. By apex, I refer to the meeting of the lambda support members.

The line of pipe can be on or above the tundra or other ground surface, in which case no ditching is required, advantageously from a conservation as well as from an economic viewpoint. There would be little problem in so installing the pipeline during the major portion of the year when all of the ground is frozen since the pipeline being installed itself would be at ambient temperature, not containing any warm fluid. The use of this mode involves minimum disturbance to the tundra, and then only in minor fashion as the holes for the support members are made in the permafrost.

The line of pipe itself can be placed various depths downward, either by varying the length of the hanging devices, or by other methods. The overburden can be removed in part, including tundra and also permafrost where necessary, and the line of pipe hung or suspended downwardly, and the overburden replaced.

Another embodiment of my invention has the appearance of one lambda inverted on another lambda, where the extending members of the support are sufficiently long as to meet and pass each other, so to speak, extending upwardly and outwardly beyond each other. The pipeline is hung below the cross-point of the supports, or rests along the cross-points, or apices.

It also is within the conception of my invention to install these lambda supports and equip them with an apex device, such as a semicircular saddle, so that the line of pipe can rest along the centers of the lambda supports on such pipe-saddles.

Referring, now, to my drawing attached, the several figures show various aspects of my invention and the main alternative ways of employing my invention.

Figure 1:
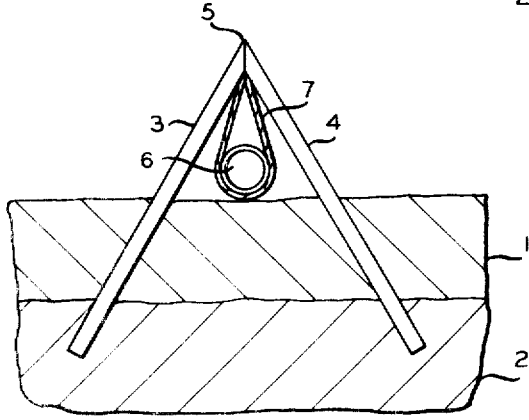

FIG. 1 shows the pipeline installed with the members of my lambda supports extending outwardly downwardly into the permafrost.

Figure 2:
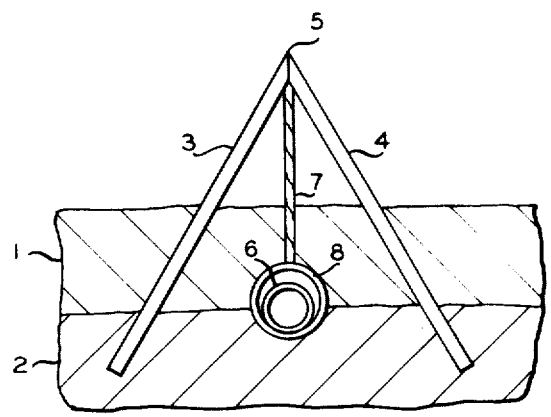

In FIG. 2 the pipe is partially in tundra and partially in permafrost.

Figure 3:
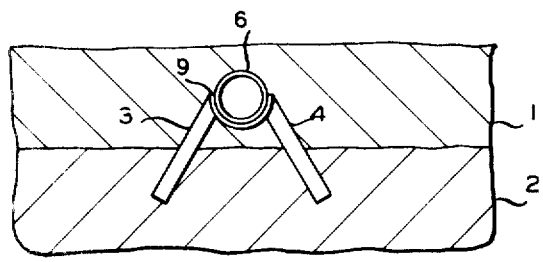

In FIG. 3 the pipe is supported by the apex of the lambda support, the whole assembly being covered with backfill.

In FIG. 4 a line of pipe is suspended between the support members and in the tundra, while another line of pipe or conduit is supported at the apex of the support members, and above the ground surface.

For installation of the supports, declivously extending holes can be drilled, cut, steam-lanced, or otherwise formed through the tundra overburden down into the permanently frozen permafrost. The lambda frame members can then be inserted, and the permafrost allowed to refreeze, such as by adding water around the frame member bottom portions if necessary. Once refrozen, the permafrost will stay that way unless again subjected to excessive quantities of heat.

Referring now to FIG. 1 with more detail, the overburden or tundra 1 is shown as the upper layer of the arctic ground, and below that the permafrost 2. Diagonally downwardly extending holes are formed into the permafrost 2. Into these holes are inserted the members 3 and 4 of the lambda support. These supports will normally form an apex 5. From the apex 5 the pipe 6 can be hung, slung, or otherwise held or maintained or supported in place. In FIG. 1 a pipe hanging device, loop or sling 7, such as a wire rope, is shown holding the pipe more or less at the ground surface.

FIG. 2 illustrates an embodiment similar to FIG. 1. The line of pipe is shown partially in the tundra 1 and partially in the permafrost 2. The pipe hanging device 7 here is shown holding a loop or ring or girdle 8 through which the pipe 6 is run.

FIG. 3 illustrates an embodiment wherein the members of the lambda support meet with a pipe-holding configuration or pipe-guide 9, such as a saddle. The line if pipe 6 can be laid along the saddles 9 of the lambda support members.

In FIG. 4 my invention is illustrated showing the lambda support members 3 and 4 meeting and forming a saddle 9 or a similar support for an upper line of pipe 6 or other type of conduit, with the upper line 6 laid on or along the supports 9 and above the tundra 1. A lower line of pipe 6 is shown hung or slung by a suspending device 7 between the lambda supports 3 and 4. The embodiment shown illustrates one line of pipe above the surface, another line of pipe within the tundra. Of course, both pipes can be above the tundra, one above and one in the tundra, both in the tundra, one on or in the tundra and one on or in the permafrost, or otherwise as desired, even closely adjacent alongside of, or above and below, each other.

Utilization of my supports to carry two lines of pipe is particularly helpful in some areas by virtue of the fact that one pipeline can be grossly different in size as opposed to the other pipeline. For example, one line of pipe can be very large carrying the primary fluid being transported, a second line of pipe then is supported along, below or above the major pipeline, more or less in close proximity thereto, carrying a tracing or heating fluid such as steam. Or, the one line can be a fluid pipeline, the other line a cable line, tube, or similar conduit for communications and the like.

My lambda supports, with the lower diagonally downwardly extending members thereof extending well into the permanently frozen permafrost, form a stable pipeline suspending support method not subject to the vague unease of the tundra in its freeze-thaw cycles. At the same time, my device permits the pipeline itself to have a degree of freedom of movement as the tundra heaves slightly from winter to summer. As slight ground movements occur, the pipeline itself in a sense will be freely hangs so that it can move slightly and avoid being torn apart by the otherwise high stresses induced by the freeze-thaw cycles of the tundra and permafrost.

The lambda support members can be of various cross-sectional shapes or configurations, depending on the manner of placement, the method by which a position for the support is formed, or the type of material of construction involved or available. The support members can be essentially round or cylindrical, square, rectangular, oval, and the like. It is to be expected that the members usually will be solid, though hollow construction is useful in some applications, such as for smaller pipes with smaller loads. A tubular or slip-tube sectional construction with holding pin is helpful in some situations. Configuration also is influenced by factors of heat conduction, as well as factors of materials availability. The pipe guides can be an integral part of the lambda supports, or can be a separate structural member of the overall lambda support.

The requirements for materials of construction primarily are strength to support the load of the pipeline, generally unaffected by wide ranging changes of temperature, and preferably minimally affected by varying exposure to water. Metal laterals and supports or combinations of metal and other materials can be utilized.

The nonheat conducting properties and high strength properties of some plastic materials will be useful, where such are available in suitable quantity and cost. Wood is basically suitable, though often not readily available in much of the arctic area. Concrete, particularly reinforced concrete, or even ceramic materials of various types, are useful.

No one method of installing my pipeline and supports will be suitable for its entire length. The variations of my pipeline and supports will be useful in various areas, depending upon the general temperatures, the thickness of the tundra overburden, presence of permafrost itself or whether a dry gravel stretch may be involved, and the like. My lambda supports provide particular flexibility in meeting varying topography and other conditions, and further provide an unusually versatile approach to pipeline laying, or hanging if you prefer, in arctic regions.

Reasonable variations and modifications of my invention are possible within the scope of my disclosure yet without departing from the scope and spirit thereof as I have disclosed in the specification hereinabove and the claims hereinafter.

I claim:

1. A pipeline assembly comprising in combination:
   a. a series of spaced lambda-shaped supports, each support including a pair of vertically diverging members with the lower extending ends of each member of said supports installed in a diagonally outwardly downwardly extending hole in the ground, said ground comprising tundra and permafrost, and said lower extending ends extending into permanently frozen permafrost beyond a depth subject to seasonal freeze-thaw and furthermore beyond area subject to heat-introduced thaw, each pair of said spaced supports essentially converging at the upper extending ends of the members thereof and thereby forming said lambda-shaped supports,
   b. means for sustaining a substantially rigid closed tubular pipeline,
   c. at least one substantially rigid closed tubular pipeline stably sustained by said series of said lambda supports.

2. A pipeline assembly according to claim 1 wherein said pipeline hangs from said upper extending ends and between said members of said lambda supports.

3. A pipeline assembly according to claim 2 further including a pipe suspending device selected from at least one of a loop, ring, sling, and tie rod.

4. A pipeline assembly according to claim 1 wherein said spaced supports support said pipeline on said upper extending ends of said lambda supports.

5. A pipeline assembly according to claim 4 wherein a plurality of said lambda supports include on the upper extending ends thereof pipe-saddles and said pipeline lies on said pipe-saddles.

6. A pipeline assembly according to claim 1 wherein said lambda supports sustain at least two pipelines.

7. A pipeline assembly as a stable conduit for the movement of warm fluids in areas subject to permafrost, said pipeline assembly comprising in conjunction a pipeline and a support assembly therefor, said support assembly comprising a series of spaced support members constructed of substantially nonheat conducting materials and installed so as to sustain said at least one pipeline, each said support assembly essentially in the form of a lambda, and said spaced support members extending declivously relative to said at least one pipeline into said permafrost and beyond a zone of thaw induced by at least one of summer heat and heat release from said warm fluids contained in said pipeline.

8. A pipeline assembly according to claim 7 further including a second pipeline laid upon and along the upper extending ends of said support assembly.

9. A method for laying a pipeline for the transport of warm fluids in the arctic area which comprises a. cutting a series of opposingly placed downwardly extending holes in the ground in said arctic area, said ground comprising tundra and permafrost, said holes extending declivously through the depths subject to seasonal freeze-thaw and into said permafrost beyond a zone of thaw induced by heat leakage from said warm fluids in said pipeline, b. installing in each of said declivously extending holes a support member such that each pair of opposingly positioned spaced declivously extending supports comprise and form a lambda support, c. sustaining at least one pipeline along said lambda supports.

10. The method according to claim 9 wherein in said step (c) said pipeline is sustained by the apices formed by the series of lambda supports.

11. The method according to claim 10 wherein a plurality of said lambda support members have a pipe saddle positioned at the apex of each pair of support members forming said lambda supports, and said pipeline is sustained along said pipe saddles.

12. The method according to claim 11 wherein said at least one pipeline is laid along said guide collars and a further pipeline is suspended from the apices of said lambda supports.

13. The method according to claim 10 wherein at least one of said pipelines is covered with backfill.

14. The method according to claim 10 wherein at least one said pipeline is further characterized as being insulated.

* * * * *